(12) United States Patent
Taylor et al.

(10) Patent No.: US 10,868,778 B1
(45) Date of Patent: Dec. 15, 2020

(54) CONTEXTUAL FEEDBACK, WITH EXPIRATION INDICATOR, TO A NATURAL UNDERSTANDING SYSTEM IN A CHAT BOT

(71) Applicant: Microsoft Technology Licensing, LLC, Redmond, WA (US)

(72) Inventors: John A. Taylor, Bellevue, WA (US); Vishwac Sena Kannan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/426,470

(22) Filed: May 30, 2019

(51) Int. Cl.
*H04L 12/58* (2006.01)
*G06F 40/40* (2020.01)

(52) U.S. Cl.
CPC .............. *H04L 51/02* (2013.01); *G06F 40/40* (2020.01)

(58) Field of Classification Search
CPC ................................. H04L 51/02; G06F 40/40
See application file for complete search history.

(56) References Cited

U.S. PATENT DOCUMENTS

| | | | |
|---|---|---|---|
| 6,871,174 B1 | 3/2005 | Dolan et al. | |
| 9,558,176 B2 | 1/2017 | Tur et al. | |
| 9,767,091 B2 | 9/2017 | Sarikaya et al. | |
| 9,881,007 B2 * | 1/2018 | Orsini | G06Q 30/0217 |
| 10,007,660 B2 | 6/2018 | Sarikaya et al. | |
| 2013/0275164 A1 | 10/2013 | Gruber et al. | |
| 2014/0040748 A1 | 2/2014 | Lemay et al. | |
| 2014/0257794 A1 | 9/2014 | Gandrabur et al. | |
| 2017/0353423 A1 * | 12/2017 | Morrison | H04L 51/046 |
| 2018/0089163 A1 * | 3/2018 | Ben AMI | G06N 3/08 |
| 2018/0375804 A1 * | 12/2018 | Stillwell, Jr. | H04L 67/20 |
| 2019/0324780 A1 * | 10/2019 | Zhu | G06F 9/453 |

FOREIGN PATENT DOCUMENTS

WO 2017112813 A1 6/2017

OTHER PUBLICATIONS

"International Search Report and Written Opinion Issued in PCT Application No. PCT/US2020/029411", dated Jul. 10, 2020, 12 Pages.

(Continued)

*Primary Examiner* — Kristie D Shingles
(74) *Attorney, Agent, or Firm* — Christopher J. Volkmann; Kelly, Holt & Christenson, PLLC

(57) ABSTRACT

A chat bot computing system includes a bot controller and a natural language processor. The natural language processor receives a first textual input and identifies concepts represented by the first textual input. An indication of the concepts is output to the bot controller which generates a response to the first textual input. The concepts output by the natural language processor are also fed back into the input to the natural language processor, as context information, along with an expiration indicator when a second textual input is received. The natural language processor then identifies concepts represented in the second textual input, based on the second natural language, textual input and unexpired context information.

20 Claims, 14 Drawing Sheets

(56) References Cited

OTHER PUBLICATIONS

"International Search Report and Written Opinion Issued in PCT Application No. PCT/US2020/029415", dated Jul. 10, 2020, 11 Pages.

"International Search Report and Written Opinion Issued in PCT Application No. PCT/US20/029414", dated Aug. 5, 2020, 12 Pages.

Salmon-Alt, Susanne, "Référence et dialogue finalisé: de la linguistique à un modèle opérationnel", Retrieved From: http://docnum.univ-lorraine.fr/public/SCD_T_2001_0013_SALMON-ALT.pdf, May 16, 2001, 272 Pages.

* cited by examiner

CONTEXTUAL FEEDBACK, WITH EXPIRATION INDICATOR, TO A NATURAL UNDERSTANDING SYSTEM IN A CHAT BOT

BACKGROUND

Computing systems are currently in wide use. Some computing systems include online chat functionality that allows users to engage in real time (or near real time) messaging with one another. Similarly, some computing systems include bots (sometimes referred to as web bots) which are applications that are run to perform tasks over a network (such as a wide area network). When a bot uses chat functionality, it is sometimes referred to as a chat bot.

Chat bots are sometimes used in computing systems in order to implement conversational interfaces. A user can interact with a conversational interface, using natural language, in order to perform a wide variety of different tasks. Some tasks include obtaining information (in which case the bot implements search functionality and returns information to a user), and performing a task (in which case the bot implements control functionality to control some physical control system or item). Chat bots can be used by users to perform a wide variety of other tasks as well.

As just a few examples, a chat bot can be used as a conversational interface to a data storage system, so that searches can be conducted, using natural language input queries. In another example, a chat bot may be used to implement an interface to a home automation system where different controllable subsystems in a home can be controlled by a user using conversational inputs to the chat bot. Chat bots can be used to make reservations, get driving directions, get weather information, and many other things.

The discussion above is merely provided for general background information and is not intended to be used as an aid in determining the scope of the claimed subject matter.

SUMMARY

A chat bot computing system includes a bot controller and a natural language processor. The natural language processor receives a first textual input and identifies concepts represented by the first textual input. An indication of the concepts is output to the bot controller which generates a response to the first textual input. The concepts output by the natural language processor are also fed back into the input to the natural language processor, as context information, along with an expiration indicator when a second textual input is received. The natural language processor then identifies concepts represented in the second textual input, based on the second natural language, textual input and unexpired context information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, chat bots are often used to implement natural language interfaces to various different types of systems. Natural language inputs often contain ambiguity. This is because natural language conversation often assumes a level of shared context between the participants in the conversation.

By way of example, assume that the following conversation takes place:

Conversation Participant 1: "What is the weather in Seattle today?"

Participant 2: "Today it will be cloudy with a chance of rain."

Participant 1: "How about tomorrow?"

Participant 2: "Tomorrow showers are likely."

Participant 1: "And Ellensburg?"

Participant 2: "Tomorrow it will be sunny in Ellensburg."

At the beginning of the conversation, the recipient of the first utterance had no context, but the first utterance ("What is the weather in Seattle today?") was unambiguous. However, the second utterance ("How about tomorrow?"), taken by itself, is ambiguous.

When these types of natural language inputs are provided through a conversational interface implemented by a chat bot, the only way for the chat bot to have understood what the user meant by the second utterance would be for it to have known the context of that utterance. The context indicates what the participants in the conversation were talking about, before the second utterance was received. In the present example, those things would include "weather" "Seattle", and "today". The same is true in responding to the users third utterance ("And Ellensburg?"). The only way to accurately respond is to know that the content of the utterance was "weather" and "tomorrow" (which would override the context of "today").

Figure 1:
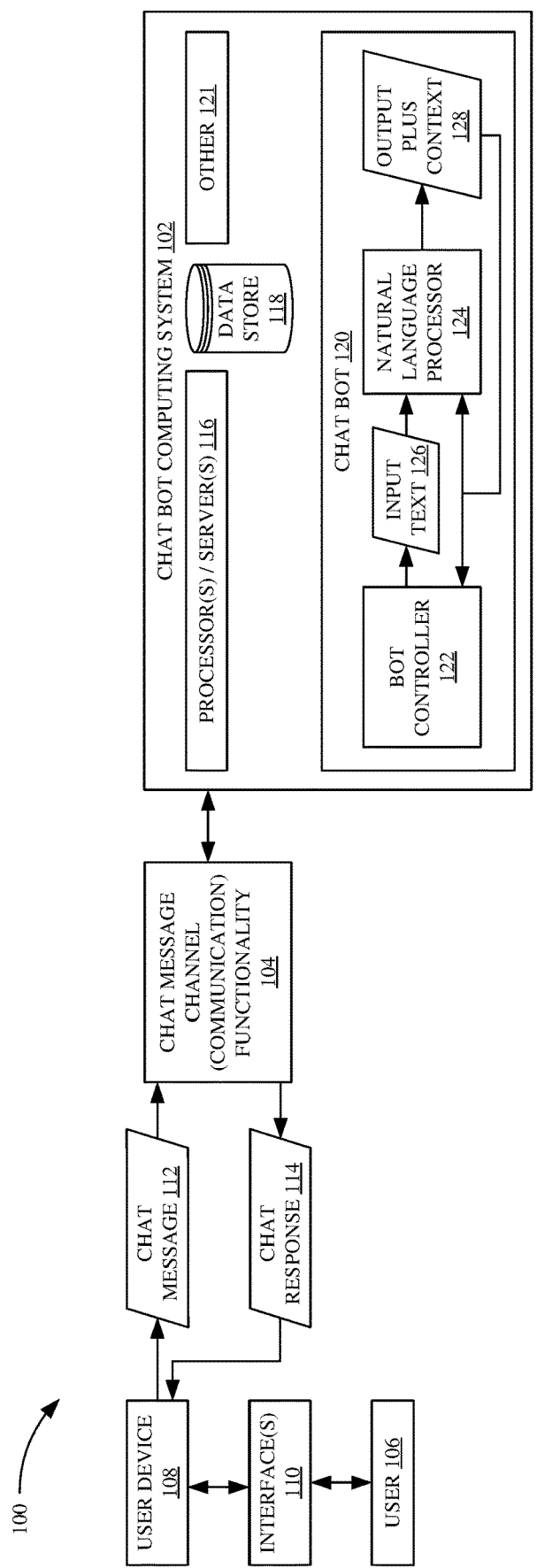
FIG. 1 is a block diagram of one example of a computing system architecture in which a chat bot computing system is used.

The present discussion thus proceeds with respect to identifying concepts in natural language inputs to a chat bot and carrying those concepts forward in the conversation, as context information, that is provided to augment subsequent utterances in the conversation. FIG. 1 thus shows one example of a computing system architecture 100, in which a chat bot computing system 102 receives chat messages over chat message channel functionality 104, from a user 106 that provides those messages through a user device 108.

User device 108 can be any of a wide variety of different types of devices. In the example shown in FIG. 1, it may be a mobile device that generates one or more interfaces 110 for interaction by user 106. User 106 illustratively interacts with interfaces 110 in order to control and manipulate user device 108 and some parts of chat bot computing system 102. As one example, interfaces 110 may include a microphone so that user 106 can provide a natural language input, as a speech input, through user device 108, and chat message channel functionality 104, to chat bot computing system 102.

By way of example, FIG. 1 shows that user 106 has provided a chat message 112 as an input to chat message channel functionality 104. Chat message 112 is provided to chat bot computing system 102. Chat bot computing system 102 processes chat message 112 and generates a chat response 114, which is provided back through chat message channel functionality 104, to user device 108 where it is surfaced for user 106 on one of interfaces 110. The interfaces 110 may be generated on display devices, audio devices, haptic devices, etc.

In the example shown in FIG. 1, chat bot computing system 102 illustratively includes one or more processors or servers 116, data store 118, chat bot 120, and it can include a wide variety of other items 121. Processors and/or servers 116 can implement chat bot 120 in a variety of different ways. In the example illustrated in FIG. 1 chat bot 102 illustratively includes a bot controller 122 and a natural language processor 124. Bot controller 122 can illustratively be code generated by a developer to implement a specific type of interface that the developer wishes to implement. Natural language processor 124 illustratively performs natural language processing on natural language text inputs to identify concepts represented by those inputs.

Thus, in one example, the chat message 112 is provided as a text input 126 from bot controller 122 to natural language processor 124. Natural language processor 124 (as will be described in greater detail below) identifies concepts in input text 126 and generates an output 128 that represents those concepts. The concepts, as is described in greater detail below, may be represented by unique identifiers.

The concepts in input text 126 (e.g., the unique identifiers) are provided back to bot controller 122 which generates a responsive chat message 114 (or takes other actions in response to those concepts). In accordance with one example, the output 128 is also fed back into natural language processor 124 along with a subsequent input text that is subsequently received (e.g., based on a second utterance) from user 106.

Thus, continuing with the example discussed above, the first input text 126 may be "What is the weather in Seattle today?" Based on that input, natural language processor 124 may identify concepts (or unique identifiers corresponding to those concepts) such as "weather", "Seattle", and "today". Those concepts may be output as output 128 to bot controller 122 which generates a responsive chat message 114 which may be "Today it will be cloudy with a chance of rain." Then, when the second utterance is received as a second chat message 112 ("How about tomorrow?"), that textual input is provided as input text 126 to natural language processor 124, along with the concepts that were identified in the first utterance ("weather", "Seattle", and "today"). Thus, natural language processor 124 generates an output indicative of the concepts represented in the second utterance based not only on the text of the second utterance, but also based on the concepts identified in the first utterance (which serves as context for the second utterance). The output generated by natural language processor 124 based upon the second utterance will again be fed back to bot controller 122, so that it can generate a response, but that output from natural language processor 124 will also be fed back into natural language processor 124, as context for a third utterance, should one be received.

Referring again to the example conversation set out above, the second response generated by bot controller 122 (in response to the second utterance "How about tomorrow?") is "Tomorrow showers are likely." User 106 then generates the third utterance "And Ellensburg?" Clearly, if one knows the context of the conversation, user 106 is asking what the weather will be like, tomorrow, in Ellensburg. Thus, the output 128 generated by natural language processor 124 in response to the second utterance ("How about tomorrow?") will include the concepts "weather", "tomorrow", and "Seattle". It will be provided to bot controller 122 so that bot controller 122 can generate the response "Tomorrow showers are likely." The concepts will also be fed back into natural language processor 124 along with the third utterance "And Ellensburg?" Since the concept "Ellensburg" is more recent than the concept "Seattle", "Ellensburg" will replace "Seattle". Thus, natural language processor 124 will know, based upon the context fed back into it, that the conversation is currently about "weather", "tomorrow" and "Ellensburg".

Natural language processor 124 will thus generate another output 128 based upon the third utterance and the context that is fed back into it from the second utterance. The output 128 based on the third utterance will be provided to bot controller 122 so that it can generate a response to the third utterance. As set out in the example conversation, that response may include "Tomorrow it will be sunny in Ellensburg."

As briefly mentioned above, in one example, natural language processor 124 includes code so that the most recent words (in the most recent utterance) will be more significant, any conflicting override, and context that accompanies them and that is fed back from the previous utterance. Therefore, in the example discussed above, when the second utterance "How about tomorrow?" is provided, the concept "tomorrow" overrides the context information for the concept "today". Thus, the concepts "weather" and "Seattle", were used to disambiguate the second utterance, but the context "today" was discarded because a more current concept "tomorrow" overrode it. The new context information for the second utterance will then be "weather", "Seattle", and "tomorrow". Then, when the third utterance is received, the concept "Ellensburg" overrides the concept "Seattle".

In the example shown in FIG. 1, natural language processor 124 can identify the concepts in an input utterance in a variety of different ways. In one example, it identifies the underlying concepts using unique identifiers, that are unique to each concept. Thus, for example, while the concept "weather" may include a number of different labels, such as "weather', "conditions", "weather conditions", etc., the underlying concept of "weather" will be represented by a single unique identifier. Similarly, while the underlying concept "Seattle" may be represented by different labels, such as "Emerald City", and "Seattle", the underlying concept of the city of Seattle will be represented by a single unique identifier.

Figure 2:
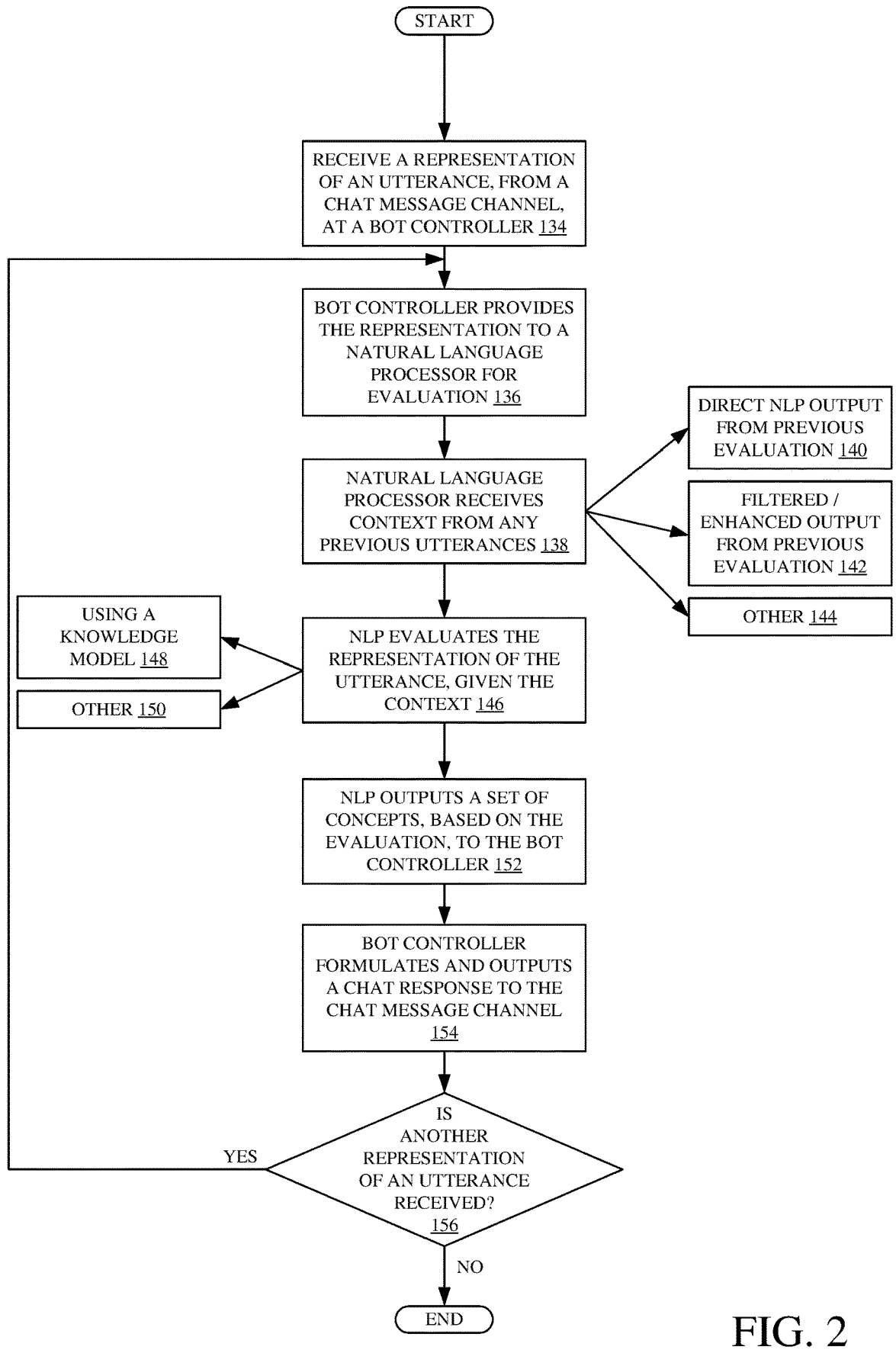
FIG. 2 is a flow diagram illustrating one example of the overall operation of the architecture illustrated in FIG. 1.

FIG. 2 is a flow diagram showing one example of the operation of architecture 100, illustrated in FIG. 1, in more detail. It is first assumed that chat bot computing system 102 receives a representation of an utterance, from a chat message channel 104. This is indicated by block 134 in the flow diagram of FIG. 2. It will be noted that the representation of the utterance may be an audio representation, a textual representation, or a different type of representation. In one example, where it is an audio representation, speech recognition is performed on that representation to generate a textual representation. This is just one example.

The bot controller 122 provides the representation of the utterance to natural language processor 124, for evaluation. This is indicated by block 136. The natural language processor receives any context, from any previous utterances, along with the representation of the utterance that is provided to it by bot controller 122. Receiving the context from any previous utterances is indicated by block 138 in the flow diagram of FIG. 2. In the example shown in FIG. 1, any output 128, that is generated by natural language processor 124, is fed directly back into natural language processor 124, with a next utterance, as the context information for that utterance. Directly providing the natural language processor output from evaluation of a previous utterance, as the context information input with a subsequent utterance, is indicated by block 140 in the flow diagram of FIG. 2.

However, as is described in greater detail below, the context information can include not only the output 128 from natural language processor 124, but it can include an enhanced or modified version of that output, or it can include context from other sources, other than the output of natural language processor 124. Providing a filtered, enhanced output from a previous evaluation is indicated by block 142 and providing context information from other sources is indicated by block 144.

Natural language processor 124 then evaluates the representation of the utterance that it has received, given the context information that it has also received. This is indicated by block 146. By evaluating the representation of the utterance, given the context, it is meant that natural language processor 124 identifies a new set of concepts based upon the newly received utterance, and its context information. It can do this in a wide variety of different ways. In one example, it uses a knowledge model (as discussed in greater detail below with respect to FIGS. 3-7). Using a knowledge model is indicated by block 148 in the flow diagram of FIG. 2. However, natural language processor 124 can evaluate the representation of the utterance, given its context, in a wide variety of other ways as well. This is indicated by block 150.

Natural language processor 124 generates and outputs a set of concepts, based on the evaluation, to bot controller 122. This is indicated by block 152. The bot controller 122 formulates and outputs a chat response to the chat message channel functionality 104, based upon the evaluation results provided by natural language processor 124. Formulating and outputting the chat response is indicated by block 154 in the flow diagram of FIG. 2.

If another representation of another utterance is received, as indicated by block 156, then processing reverts to block 136 where the bot controller 122 provides that representation to the natural language processor 124. Then, at block 138, natural language processor 124 receives the context information from the previous utterance, and evaluation proceeds. Thus, as shown with respect to FIGS. 1 and 2, natural language processor 124 interprets (or evaluates) a particular utterance based not only on the information in that particular utterance, itself, but based also on context information from previous utterances. This can be used to greatly enhance the operation of chat bot computing system 102. It can be used to disambiguate utterances, and to increase the accuracy with which a natural language interface is implemented, among other things. The context can be captured as an unordered set of unique identifiers, which may be expressed as URIs or in other ways.

Figure 3:
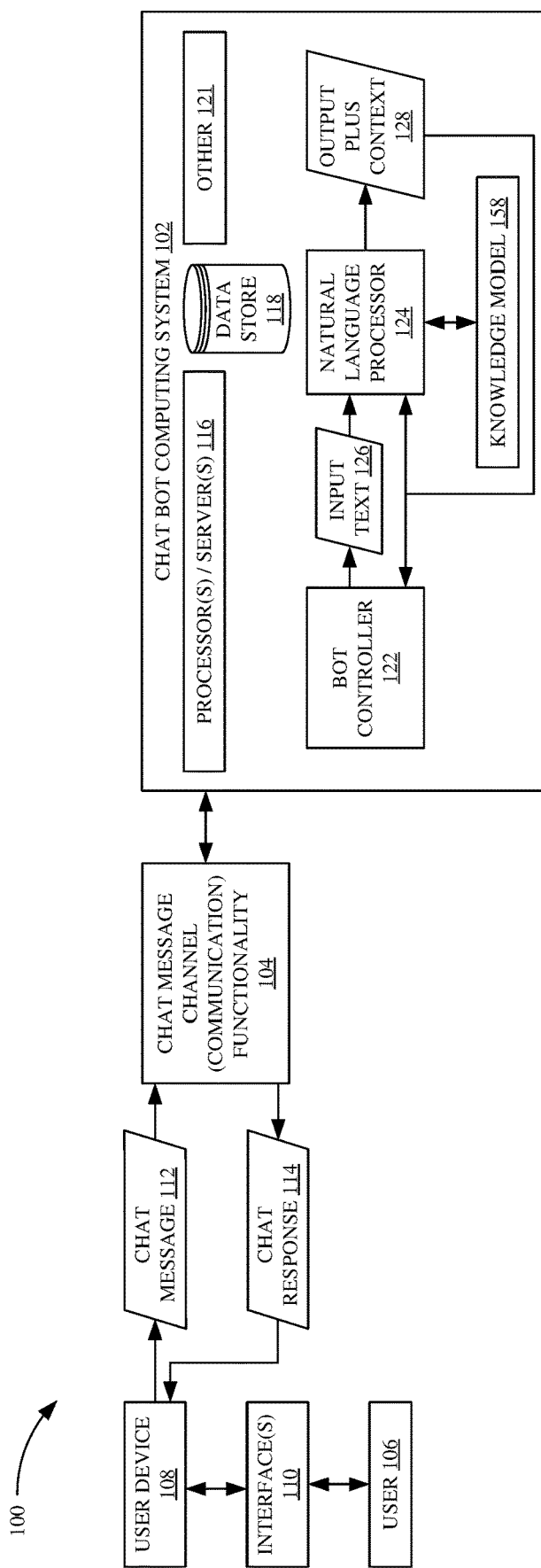
FIG. 3 is a block diagram showing the architecture illustrated in FIG. 1, using a knowledge model.

FIG. 3 shows another example of architecture 100, which is similar to the example of architecture 100 shown in FIG. 1, and similar items are similarly numbered. However, FIG. 3 also shows that natural language processor 124 now has access to a knowledge model 158 which can be used to identify concepts based on the utterances and context information provided to natural language processor 124. Knowledge model 158 illustratively relates language (words and text in utterances) to subject matter, or concepts, which become the output 128 of natural language processor 124. Those concepts also become context information to a next subsequent utterance (and perhaps more subsequent utterances) that are received.

Each concept may have multiple different labels. For instance, the weather might be described as "gloomy". However, when someone is emotionally sad, their emotional state may also be described as "gloomy". Thus, a concept of "overcast weather" may be labeled "gloomy". Similarly, the concept of "a sad emotional state" may also be labeled as "gloomy". Further, knowledge model 158 illustratively accounts for synonyms. For example, the concept of "a sad emotional state" may be labeled with the linguistic labels (e.g., with the words) "sad", "unhappy", "gloomy", among others.

Figure 3A:
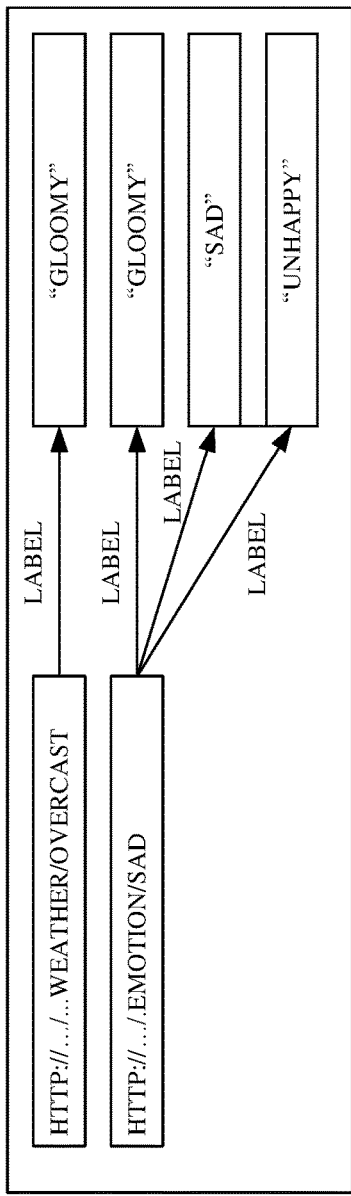
FIGS. 3A and 3B and 3C show examples of different portions of a knowledge model.

FIG. 3A shows examples of these types of modeled concepts. FIG. 3A shows that the concept "overcast" can have a label "gloomy". However, the concept "emotion—sad" can also have a label "gloomy" as well as a label "sad" and a label "unhappy".

In addition, concepts may also be related to other concepts, and not just labels. Knowledge model 158 also illustratively captures these types of relationships because context information that is output by natural language processor 124 may include not only the concepts identified in the textual input 126, but also closely related concepts. For example, it may be useful to relate the discrete concepts of "ski conditions" and "driving conditions" to the concept of "weather".

Figure 3B:
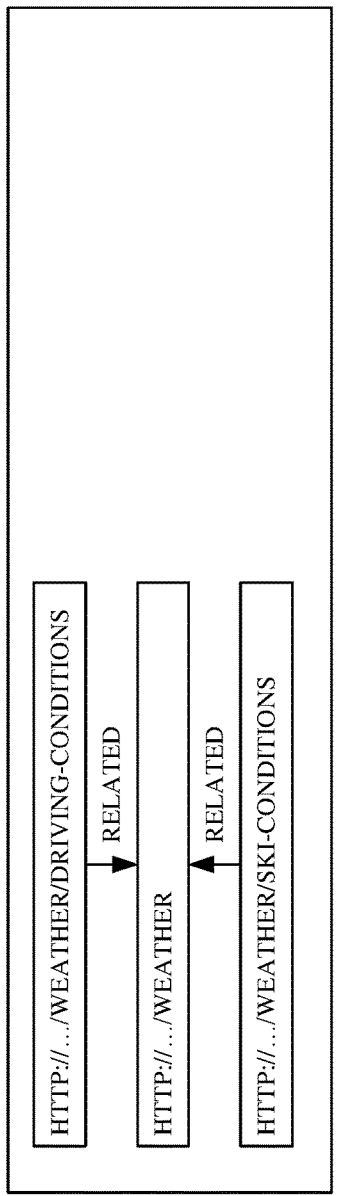

FIG. 3B shows one example of this. FIG. 3B shows that the concepts "weather—driving conditions" and "weather—ski conditions" are both related to the concept "weather".

It can also be useful to name these types of relationships and make them directional. For instance, it may be helpful for knowledge model 158 to indicate that the concept of an "emotional state" is broader than the concept of the "emotional state-sad". Similarly, that the concept "emotional state-sad" is broader than the concept of the "emotional state—pessimistic". Further, concepts may have the same relationship to more than one different concept. For example, the concept of the "emotional state-pessimistic" may have a relationship to two different concepts that are both broader. It may, for instance, have a relationship to a broader concept "emotional state—negative" and also have a relationship to a broader concept "emotional state".

Figure 3C:
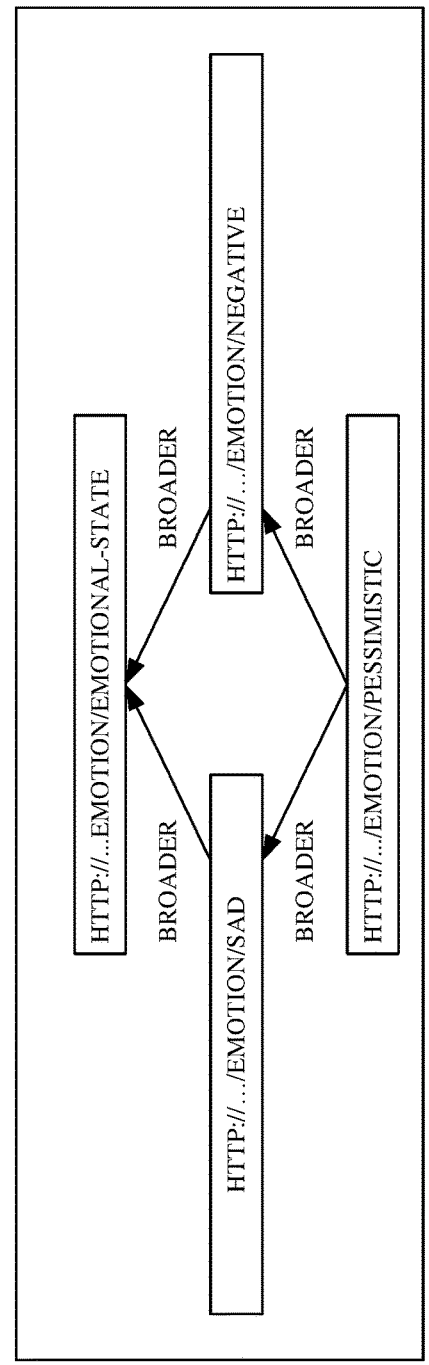

FIG. 3C shows one example of these types of relationships. FIG. 3C shows that both of the concepts "emotion—sad" and "emotion—negative" are related to a broader concept "emotion—emotional state". Similarly, the concept "emotion—pessimistic" is related to two broader concepts, the first being "emotion—sad", and the second being "emotion—negative".

Thus, in one example, knowledge model 158 represents different concepts, that are each given unique identifiers. The concepts can be related to other concepts with named and directional relationships. They can be labeled with natural language words (e.g., linguistic labels). There can be many different labels for a particular concept and the labels themselves may not be unique in the sense that the same label can be used on different concepts. The underlying concepts, however, are unique relative to other model concepts.

Figure 4:
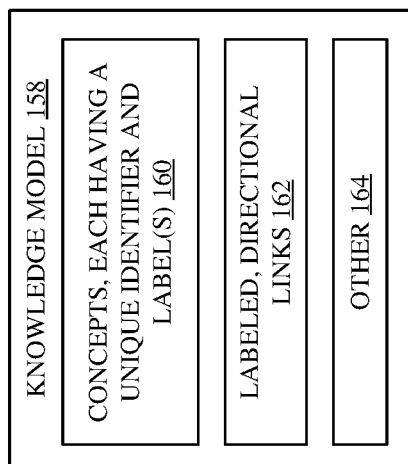
FIG. 4 is a block diagram showing one example of a knowledge model.

FIG. 4 thus shows a block diagram of one example of knowledge model 158. Knowledge model 158 has a set of concepts each represented by a unique identifier and one or more linguistic labels (words). The concepts are identified by block 160 in FIG. 4. The concepts can be connected to the linguistic labels by connections or links. It will be noted that if model 158 is to be localized to a different language, the unique identifiers that represent the underlying concepts need not be localized because they are language-independent. The linguistic labels, however, will be localized.

The concepts can also be connected to one another by labeled, directional links 162. Model 158 can include a wide variety of other items 164 as well. Thus, in operation, the example of architecture 100 shown in FIG. 3 operates similar to that shown in FIG. 1. However, in FIG. 3, natural language processor 124 identifies the concepts represented by input text 126 (and any context fed back into natural language processor 124 from the previous evaluation) using knowledge model 158. One example of this is described below with respect to FIG. 7.

Figure 5:
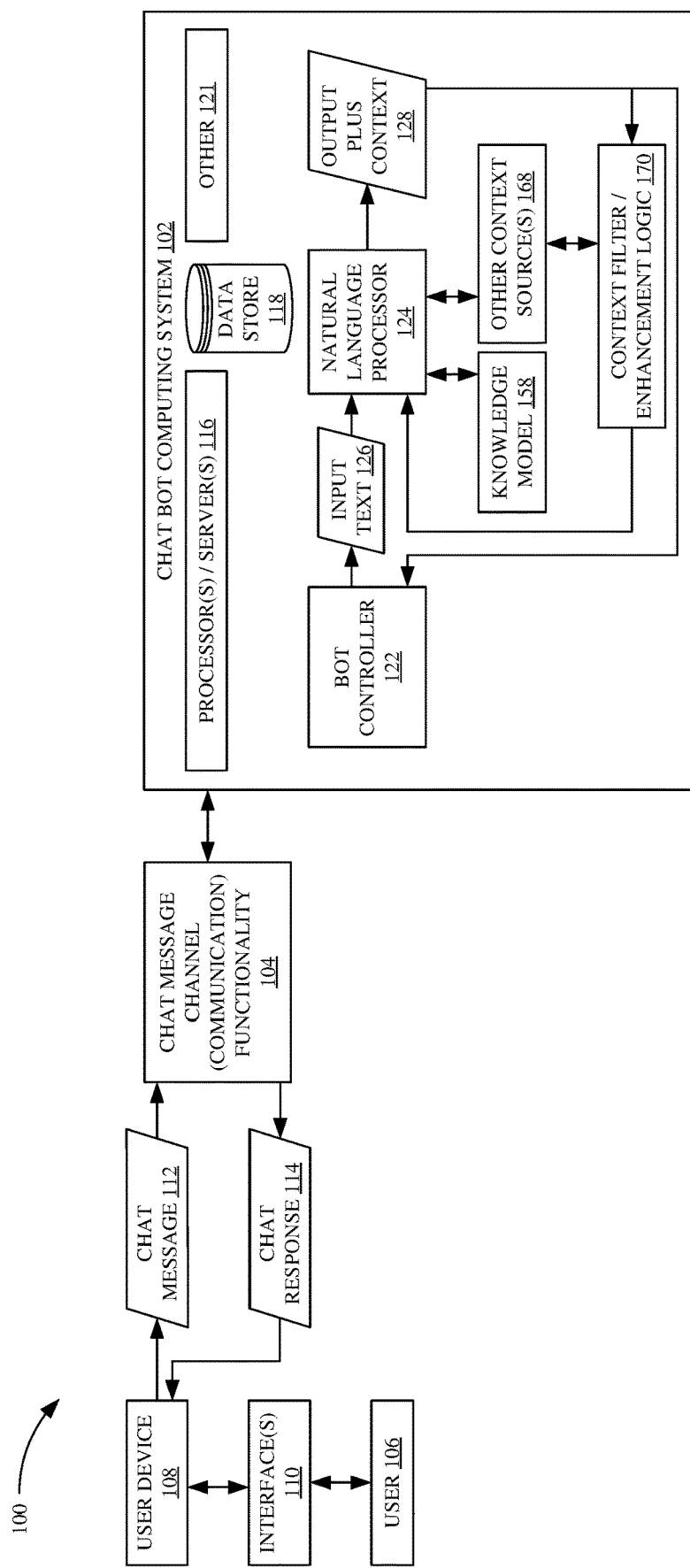
FIG. 5 is a block diagram showing the architecture illustrated in FIG. 3, using context filter/enhancement logic.

FIG. 5 shows another example of architecture 100, which is similar to the example shown in FIG. 3. Similar items are similarly numbered. However, chat bot computing system 102, in the example shown in FIG. 5, also includes other context sources 168 that can provide context to natural language processor 124 in addition to, or instead of, language model 158, and in addition to the context fed back from the output 128 generated for a previous utterance. FIG. 5 also shows that, in one example, the output 128 is provided to bot controller 122 so that it can formulate a chat response 114 to the utterance just received. However, it is fed back into natural language processor 124, as context information for a next subsequent utterance, after being provided to context filter/enhancement logic 170. Logic 170 can enhance and/or filter the output 128 to provide filtered and/or enhanced context information to natural language processor 124, along with the next subsequent utterance that is received. Thus, in the example shown in FIG. 5, natural language processor 124 is not only capable of receiving enhanced and filtered context output from logic 170, based upon a previous evaluation result or output 128, but it can also receive context from other sources 168 which may be provided by a developer in order to further customize the natural language interface experience implemented by chat bot computing system 102.

Figure 6:
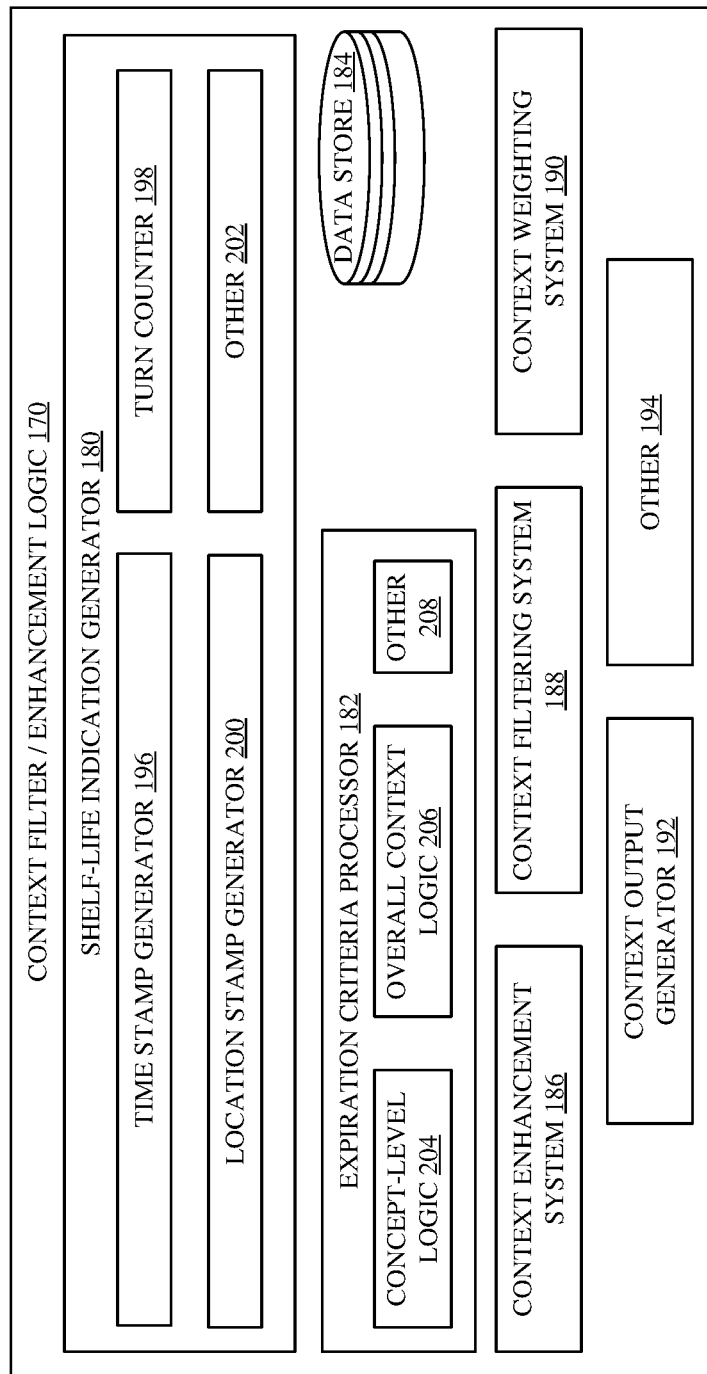
FIG. 6 is a block diagram showing one example of the context filter/enhancement logic, in more detail.

Before describing the operation of architecture 100, in the example shown in FIG. 5, a brief description of context filter/enhancement logic 170, will first be provided. FIG. 6 shows one example of a block diagram illustrating logic 170, in more detail. In the example shown in FIG. 6, context filter/enhancement logic 170 illustratively includes shelf-life indication generator 180, expiration criteria processor 182, data store 184, context enhancement system 186, context filtering system 188, context weighting system 190, context output generator 192, and it can include a wide variety of other items 194. Shelf life indication generator 180 illustratively includes, itself, timestamp generator 196, turn counter 198, location stamp generator 200, and it can include other items 202. Expiration criteria processor 182, itself, illustratively includes concept-level logic 204, overall context logic 206, and it can include other items 208.

Before describing logic 170 in more detail, it will be understood that concepts often have a useful duration or scope (also referred to as shelf life). Therefore, the context information provided along with an utterance may have a limited useful duration (or shelf life). The shelf life may be determined by a number of different criteria. In one example, temporal criteria may be used to determine the shelf life of a concept in context information. For instance, if an utterance is received by chat bot computing system 102 on a Monday that inquiries about the weather that day, then if the next utterance is received two days later, the context information generated from the previous utterance is very likely no longer applicable or meaningful to the second utterance. Thus, including the concept information from the first utterance, as context information in the second utterance, may have a limited useful duration, and that duration may be identified using temporal criteria (such as a time stamp).

The limited usefulness of context information can also be generalized to other dimensions, other than time. For instance, chat bot computing system 102 may implement a natural language interface on an automobile. In that case, the user may provide an utterance looking for the nearest gas station. However, the next subsequent utterance may be an utterance that is provided by user 106 after the automobile has traveled 100 miles since the previous utterance. In that case, the previous utterance looking for the nearest gas station is not very likely to be useful as context information for the next subsequent utterance. Similarly, in the same example, if the first utterance is inquiring as to the next closest freeway exit, and the second utterance is provided after the automobile has already exited the freeway, then the first utterance may be of limited usefulness as context information to the next subsequent utterance. Thus, in this example, the shelf life or expiration criteria may be location (or geographic position) information (such as a current geographic location), instead of temporal information.

Further, it may be learned that context information is often only useful for a particular maximum number of dialog turns. By way of example, it may be found that context information is only useful for three dialog turns (in which three utterances have been received and responded to by chat bot computing system 102). After that, it may be found that the usefulness of the context information from the first utterance is relatively low. Thus, in such a scenario, the expiration criteria may be the number of dialog turns that have been processed within a given amount of time. It will be noted, of course, that the number of dialog turns that are used to identify usefulness may be any number, and three is provided by way of example only.

In the example illustrated in FIG. 6, shelf life indication generator 180 illustratively generates a shelf life indicator that is associated with the output 128 generated by natural language processor 124, before that output is fed back in as context information along with the next utterance. The shelf life indicator is then compared against expiration criteria, or shelf life criteria, to determine its relevance to the next sequence utterance.

In one example, the expiration criteria (or shelf life criteria) may be temporal criteria. In that case, timestamp generator 196 generates a timestamp for each concept that will be fed back as context information. In an example where the shelf life or expiration criteria includes the number of dialog turns, then turn counter 198 generates a turn count indication, identifying the particular dialog turn (within the last predetermined amount of time) for which the output 128 is generated. Similarly, where the shelf life or expiration criteria include location information, then location stamp generator 200 generates a location stamp (e.g., based on information received from a GPS receiver or other position identifier) indicating a location of user device 108 when the chat message 112 was received.

It will be noted that a shelf life indicator can be generated for each individual concept. One can also be generated for the output 128, as a whole.

Expiration criteria processor 182 then processes the shelf life indication (such as by comparing it to expiration criteria) that are associated with, or attached to, the different items of context information that are fed back into natural language processor 124. This is done to determine the relevance of the context information to the next utterance. For instance, concept-level logic 204 processes the shelf life information corresponding to each concept identifier that is fed back in as context information. Each item of context information (e.g., each concept) may be generated at a different time, based upon a different utterance. A time stamp is generated for it at that time. When a concept is fed back in as an item of context, it is associated with that timestamp. When enough time has elapsed between the timestamp on a given concept, then that item may be treated as less relevant to a subsequent utterance. It may be removed from the context information fed back into natural language processor 124. It may be assigned a lower relevance weight, etc.

Overall context logic 206 evaluates the shelf life information associated with an overall context (e.g., which may include multiple concepts from an utterance or aggregated and carried forward over time from multiple utterances) that is fed back into natural language processor 124. By way of example, the entire context that is to be fed back into natural language processor 124 may have been generated from utterances that were input when a vehicle was at a location that is 100 miles from the current location. In that case, logic 170 may discard the entire context as being irrelevant.

Context enhancement system 186 can illustratively interact with other context sources 168 to obtain other context information. Other context sources 168 may be specified or generated by a developer to provide certain behavior for chat bot computing system 102. Context filtering system 188 illustratively filters items of context based on the expiration (or shelf life) criteria or for other reasons. Context weighting system may weight different items of context based upon their shelf life or expiration criteria. For instance, as an item of context ages (based upon its timestamp) it may be weighted lower by context weighting system 190, because it is likely less relevant than when it was first generated. Similarly, when an item of context was generated in a first dialog turn, then its weight may be decreased with each subsequent dialog turn, because it is likely becoming less relevant. Similarly, when an item of context was generated at a first location, the weight of that item of context may be reduced as the user moves further away from that particular location. These are examples only.

Context output generator 192 then generates an output indicative of the filtered and/or enhanced context, to natural language processor 124, so that it can be considered along with the next subsequent utterance.

Figure 7:
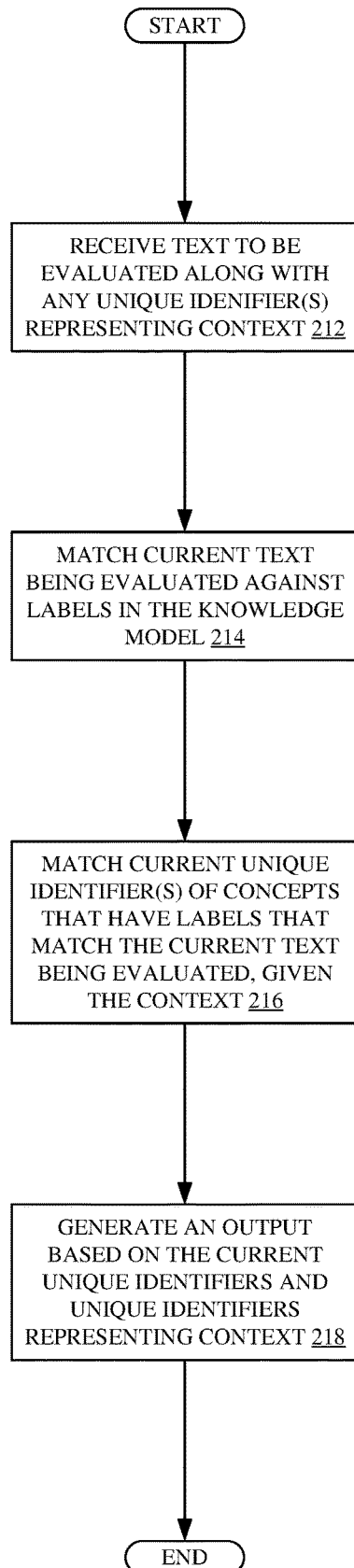
FIG. 7 is a flow diagram illustrating one example of the architectures illustrated in the previous figures, using a knowledge model.

FIG. 7 is a flow diagram showing one example of the operation of architecture 100, in which natural language processor 124 uses knowledge model 158 to identify concepts in textual input 126, given its context information.

In one example, model 158 can be distributed so that different parts of the model can be created at different times by different systems and from different data sources and then combined. The combined model can then be used to build a runtime execution model, during runtime. Similarly, knowledge model 158 may be structured in a non-hierarchical way. While the concepts are modeled with unique identifiers, name spaces may be used for relationship names.

It is first assumed that natural language processor 124 receives text 126 to be evaluated along with any unique identifiers representing context from the previous utterance. This is indicated by block 212 in the flow diagram of FIG. 7. Natural language processor 124 then matches the current text 126 being evaluated against labels in the knowledge model 158. This is indicated by block 214. By way of example, input text 126 will have linguistic elements (such as words) that can be matched to the labels and underlying concepts modeled by knowledge model 158. The match can be guided or informed by the context information from the previous utterance.

Natural language processor 124 identifies current unique identifiers of concepts that have labels that best match the current text being evaluated, given the context information. Again, by way of example, assume that the knowledge model 158 includes entries such as that shown in FIG. 3C. Assume also that the concept "sad" has labels such as that shown in FIG. 3A. Assume further that the input text 126 includes the word "unhappy". In that case, knowledge model 158 would indicate that the input text matches the concept "sad" and thus, the unique identifiers for the concept "sad" would be surfaced by knowledge model 158. Identifying the current unique identifiers of concepts that have labels that match the current text being evaluated, is indicated by block 216 in FIG. 7.

Natural language processor 124 then generates an output 128 based on the current unique identifiers identified for the text input 126, and based on the unique identifiers representing the context information that was received. This is indicated by block 218 in the flow diagram of FIG. 7. It can thus be seen that knowledge model 158 can be used to surface the unique identifiers for the different concepts, based on the input text 126, given its context. It can be used to enhance the context information by expanding to neighboring concepts in knowledge model 158 as well.

Figure 8:
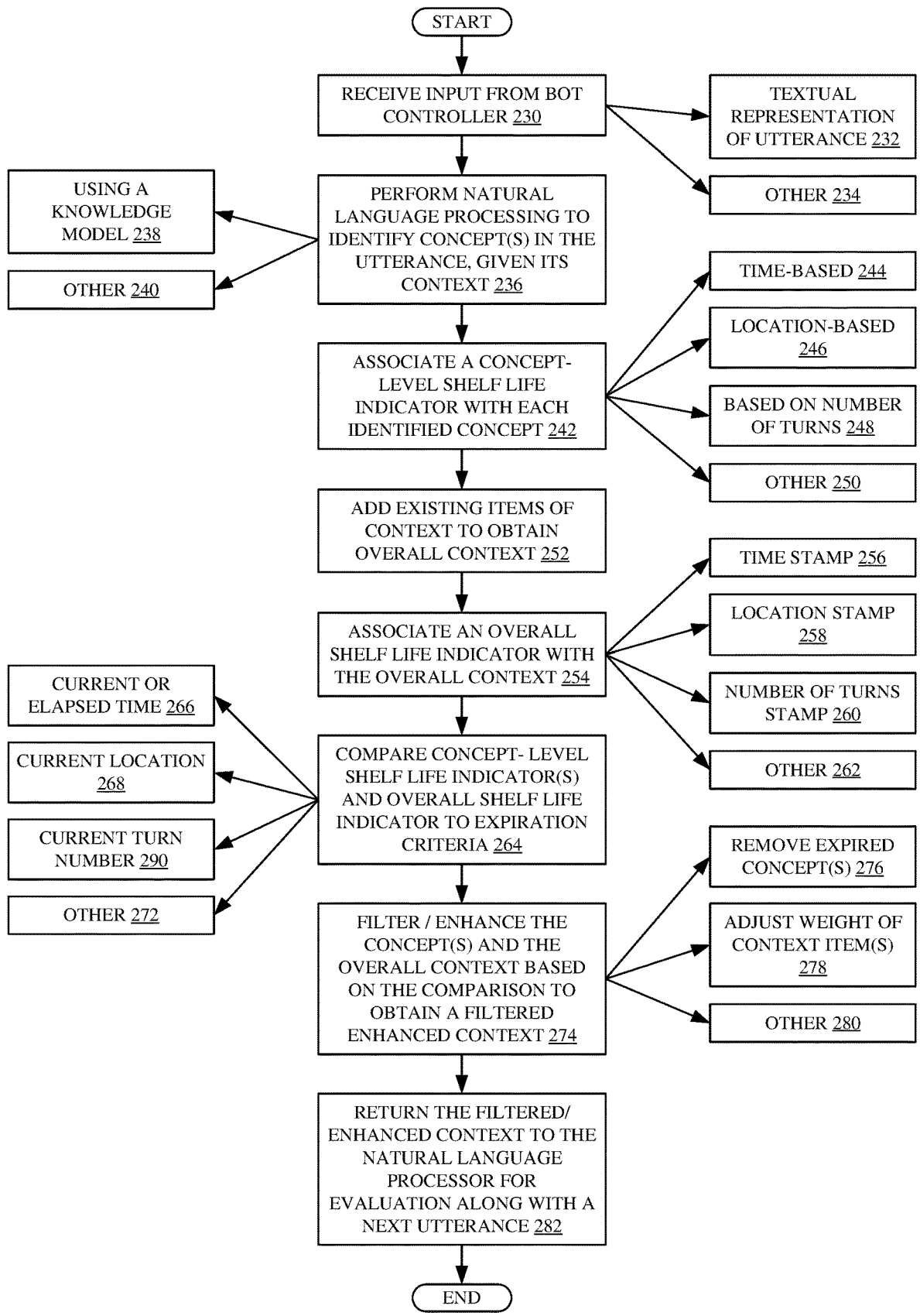
FIG. 8 is a flow diagram showing one example of the operation of the architecture shown in the previous figures using the context filter/enhancement logic.

FIG. 8 is a flow diagram illustrating one example of the operation of context filter/enhancement logic 170 in using shelf life or expiration criteria when generating context to be fed back to natural language processor 124, with a subsequent utterance. Natural language processor 124 first receives the input text 126 from bot controller 122. This is indicated by block 230 in the flow diagram of FIG. 8. It can be a textual representation of an utterance as indicated by block 232, or another representation as indicated by block 234.

Natural language processor 124 then performs natural language processing to identify the concepts in the utterance, given its context. This is indicated by block 236. It can do this using knowledge model 158, as indicated by block 238 in the flow diagram of FIG. 8. It can do this in other ways as well, as indicated by block 240. Then, before providing those unique identifiers (of concepts) back to the natural language processor 124 with a subsequent utterance, context filter/enhancement logic 170 first associates a concept-level shelf life indicator with each identified concept. This is indicated by block 242 in the flow diagram of FIG.

8. In one example, timestamp generator 196 generates a time-based indicator 244 (such as a timestamp indicating when the concept identifier was identified). In another example, location stamp generator 200 generates a location-based shelf life indicator 246 indicating a location where user device 108 was, when the chat message 112 being evaluated was received. In another example, turn counter 198 generates a dialog turn-based indicator, as indicated by block 248, indicating, for which dialog turn the concept was identified. The shelf life indicator can be generated in a wide variety of other ways as well, and this is indicted by block 250 in the flow diagram of FIG. 8.

Once the shelf life indicator has been associated with each of the concepts identified based on the present utterance, then any other already-existing items of context can be added to the output 128 before it is fed back to natural language processor 124, as context for the next utterance. This is referred to as the overall context information that will be fed back along with the next utterance. Adding the existing context items to obtain the overall context is indicated by block 252 in the flow diagram of FIG. 8.

Shelf life indication generator 180 then associates an overall shelf life indicator with the overall context. This is indicated by block 254 in the flow diagram of FIG. 8. Again, this can be a timestamp 256, a location stamp 258, a stamp indicating the number of turns, as indicated by block 260 in the flow diagram of FIG. 8, or another overall shelf life indicator 262.

Expiration criteria processor 182 then compares the concept level shelf life indicators and the overall shelf life indicator to expiration criteria to see if any of the context information should be filtered out of (or de-weighted in) the overall context that is provided to natural language processor 124, as context for the next utterance. Comparing the shelf life indicators to expiration criteria is indicated by block 264 in the flow diagram of FIG. 8. Concept level logic 104 compares the shelf life indicators for each individual concept item to the expiration criteria in order to determine whether an individual concept should be removed from (or de-weighted in) the overall context. Overall context logic 206 compares the shelf life indicator for the overall context to determine whether the overall context is irrelevant, should have a reduced weight, or should be processed in a different way.

The form of the expiration criteria will depend on the form of the shelf life indicator. For instance, where the shelf life indicator is a time stamp, then the expiration criteria may be an elapsed time criteria indicating that the concept associated with the time stamp is no longer relevant, has reduced relevance, etc. Filtering context based on a current or elapsed time is indicated by block 266.

If the shelf life indicator is a location stamp, then expiration criteria processor 182 may compare the location stamp against a current location of user device 108. Analyzing expiration criteria based on a current location is indicated by block 268.

If the shelf life indicator is a dialog turn count indicator, then the expiration criteria may be a current turn count number. Evaluating the expiration criteria based upon a current turn count number is indicated by block 270.

It will be appreciated that evaluation of the expiration criteria can be done in a wide variety of other ways as well. This is indicated by block 272.

Context filter/enhancement logic 170 then filters or enhances the individual concepts and the overall context based on the comparison to the expiration criteria, to obtain a filtered/enhanced context. This is indicated by block 274 in the flow diagram of FIG. 8. For instance, context filtering system 188 can remove expired concepts from the context to be returned to natural language processor 124 with the next subsequent utterance. Removing expired concepts is indicated by block 276. Context weighting system 190 can adjust the weights of the various concepts before they are provided back, as context, for the next utterance. Adjusting the weight of the context items, that will be provided to natural language processor 124 in the next evaluation, is indicated by block 278 in the flow diagram of FIG. 8. Context filter/enhancement logic 170 can filter and/or enhance the context in other ways as well, and this is indicated by block 280 in the flow diagram of FIG. 8.

Context enhancement system 186 can enhance the context by obtaining additional context from other context sources 168. It can enhance the context information in other ways as well.

Context output generator 192 then generates an output indicative of the filtered/enhanced context information and provides it to natural language processor 124 so that it can be considered as context information with the next subsequent utterance. Returning the filtered/enhanced context to the natural language processor 124 for evaluation along with a next utterance is indicated by block 282 in the flow diagram of FIG. 8.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
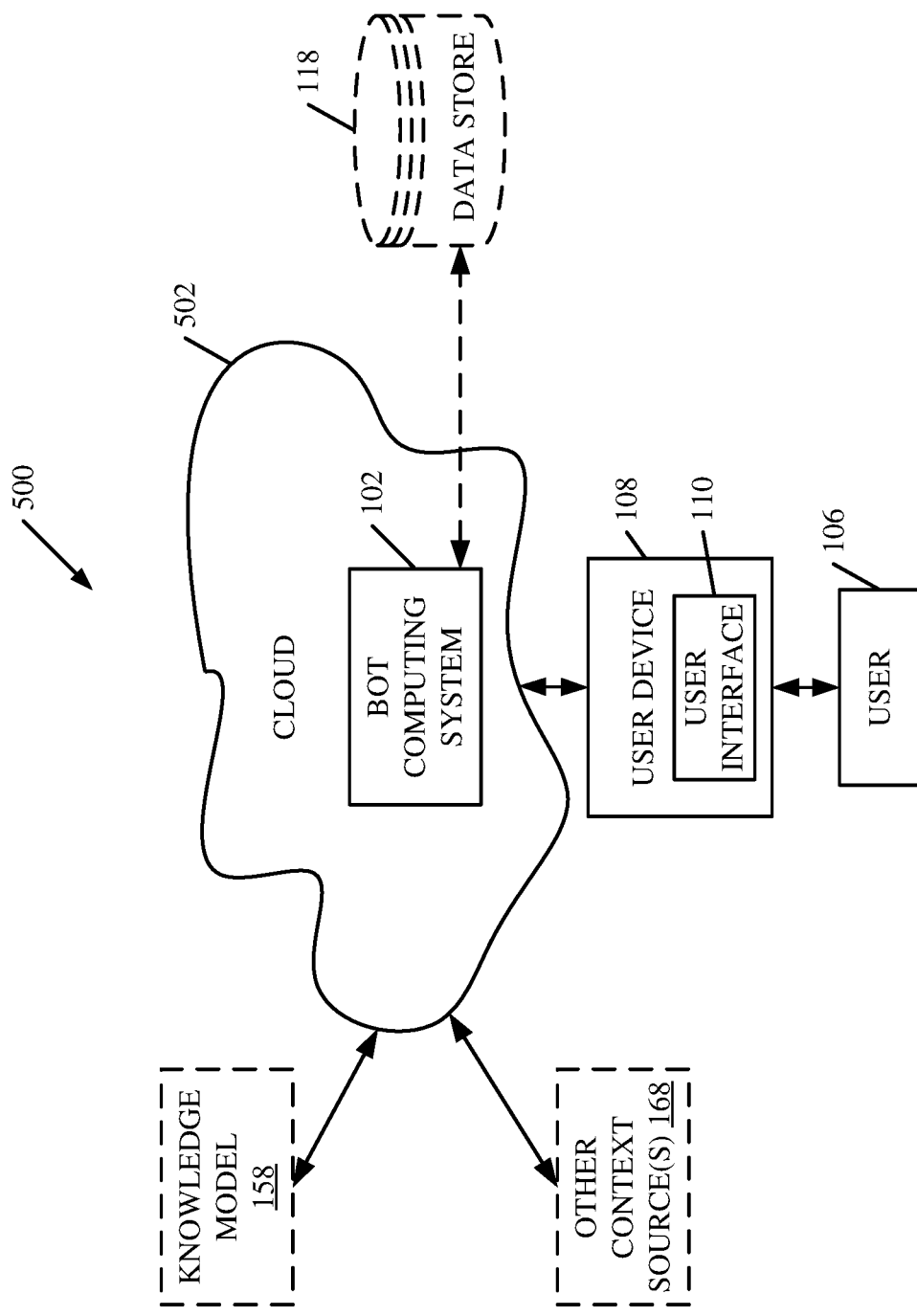
FIG. 9 shows one example of the architectures illustrated in the previous figures, deployed in a cloud computing architecture.

FIG. 9 is a block diagram of architecture 100, shown in previous FIGS., except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in previous FIGS. and they are similarly numbered. FIG. 9 specifically shows that computing system 102 can be located in cloud 502 (which can be public, private, or a combination where portions are public while others are private). Therefore, user 106 uses a user device 108 to access those systems through cloud 502.

FIG. 9 also depicts another example of a cloud architecture. FIG. 9 shows that it is also contemplated that some elements of computing system 102 can be disposed in cloud 502 while others are not. By way of example, data store 118 can be disposed outside of cloud 502, and accessed through cloud 502. In another example, knowledge model 158 and other context sources 168 (or other items) can be outside of cloud 502. Regardless of where they are located, they can be accessed directly by device 108, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
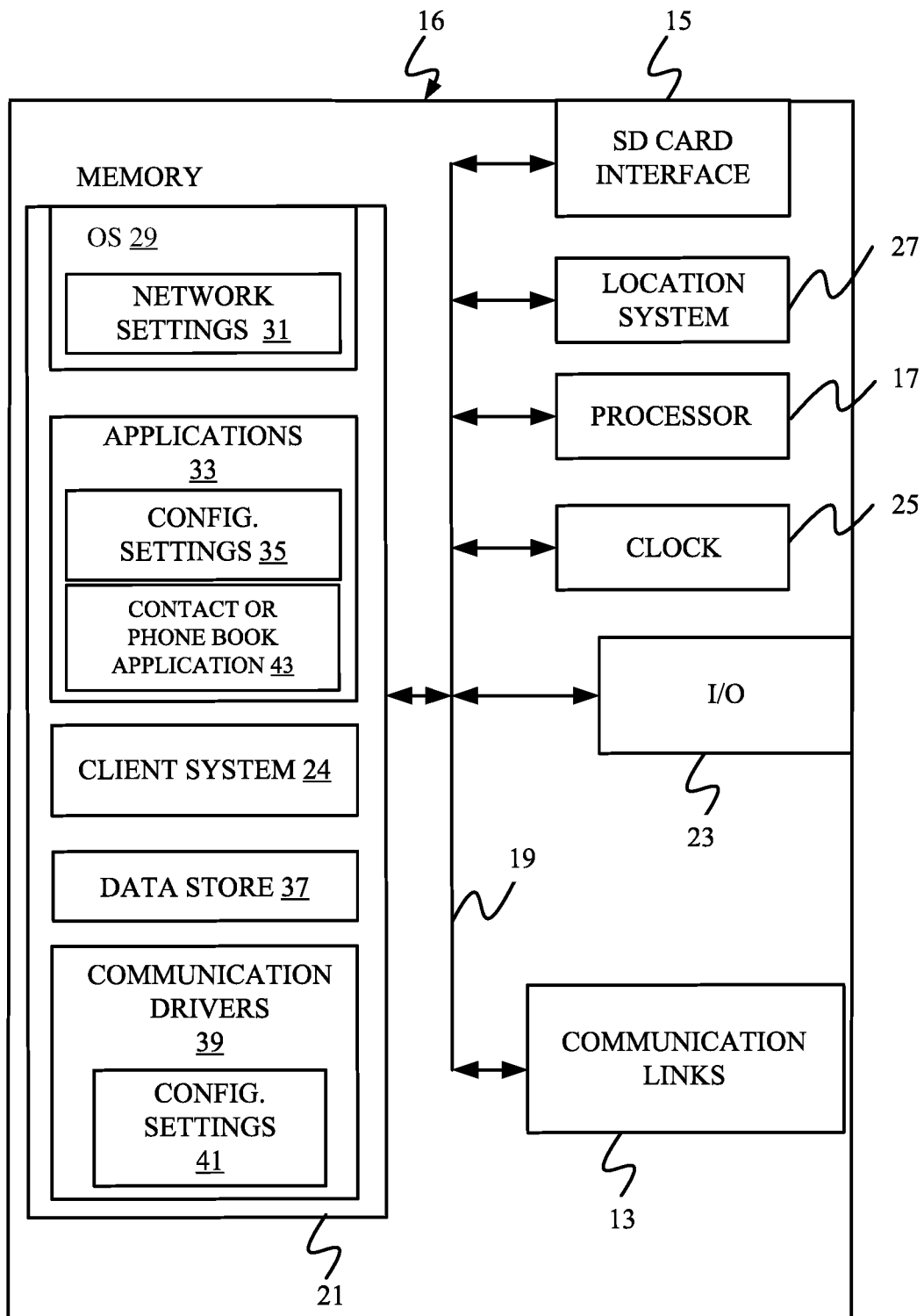
FIGS. 10-12 show examples of mobile devices that can be used in the architectures shown in the previous figures.
Figure 11:
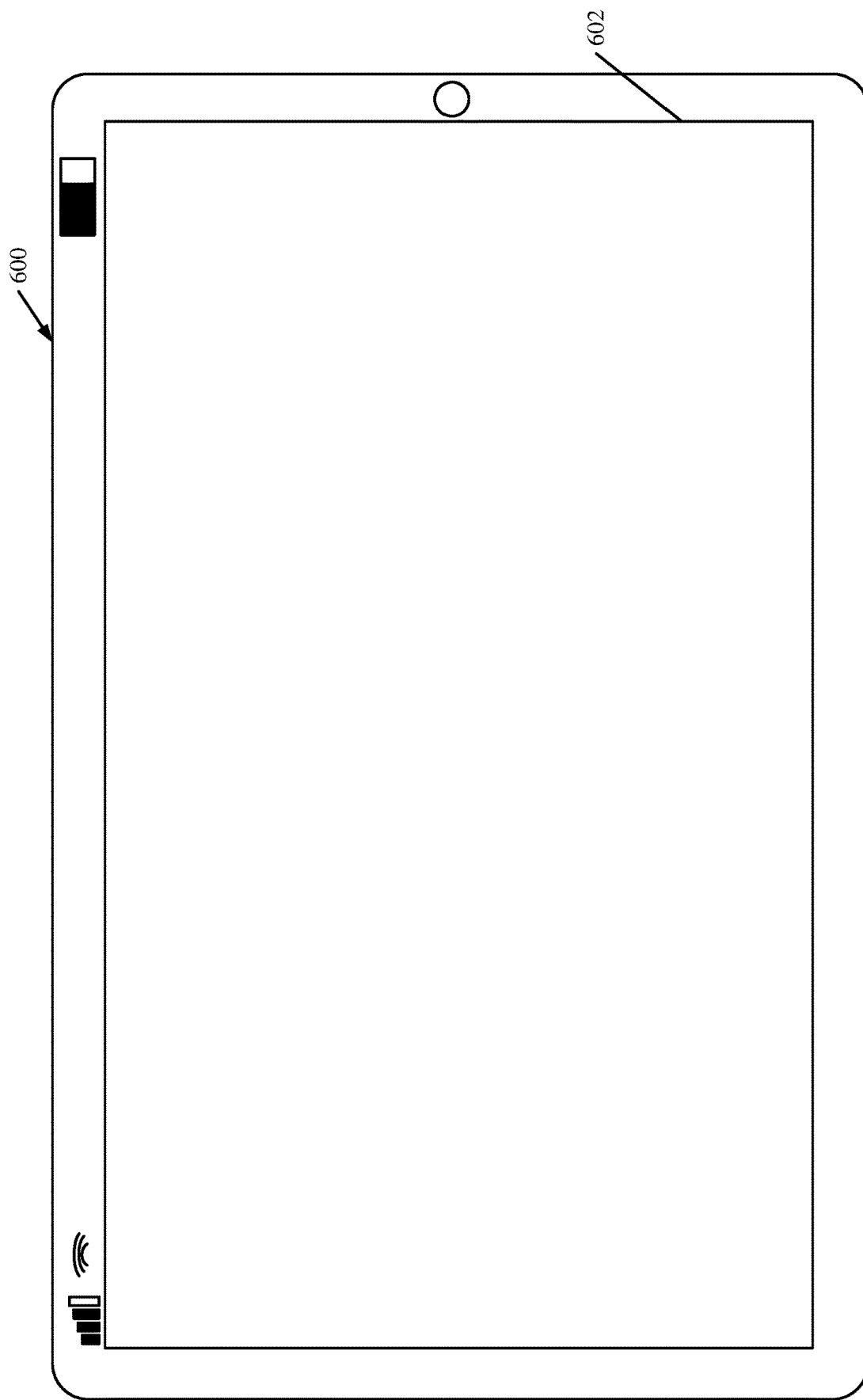
Figure 12:
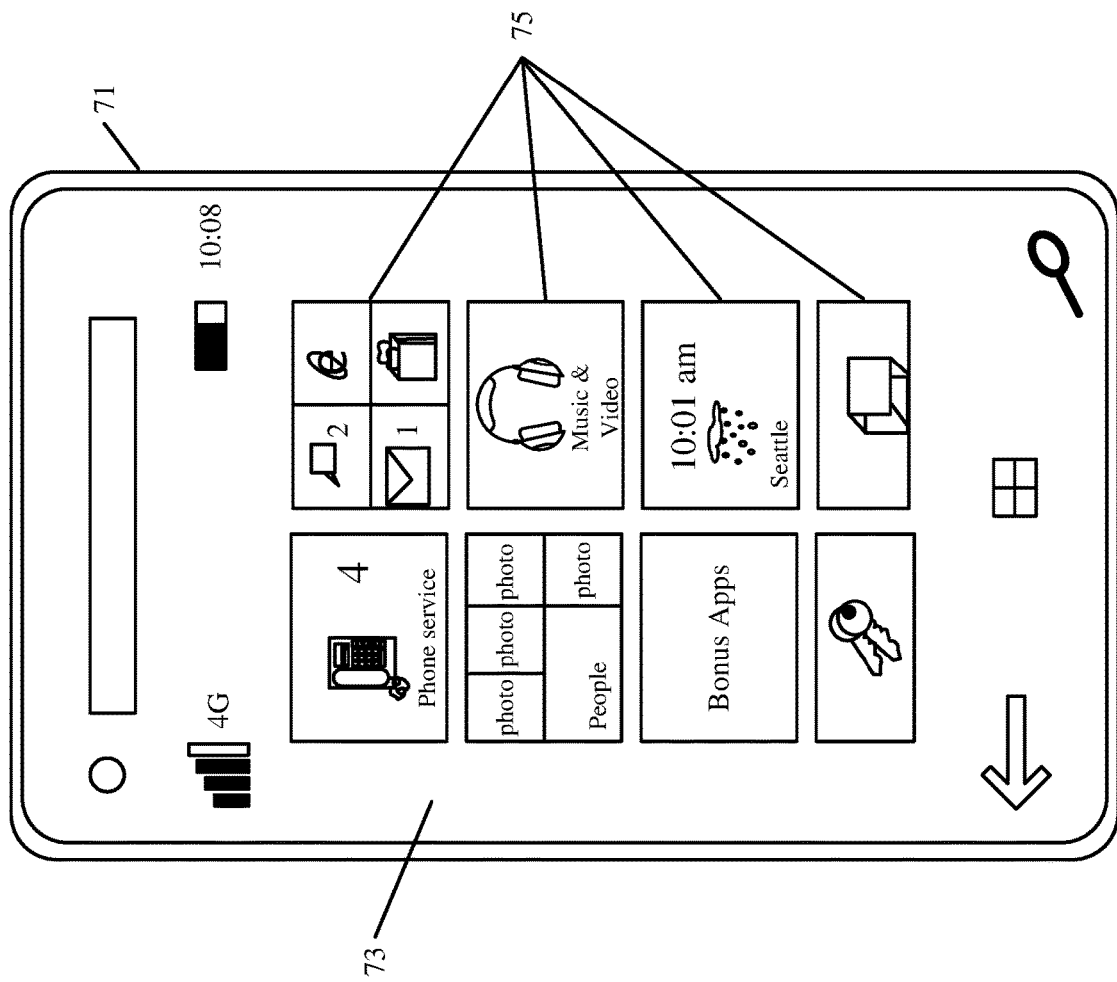

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components of computing system 102 or user device or that interacts with architecture 100, or both. In the device 16, a communications link 13 is provided that allows the handheld device to communicate with other computing devices and under some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
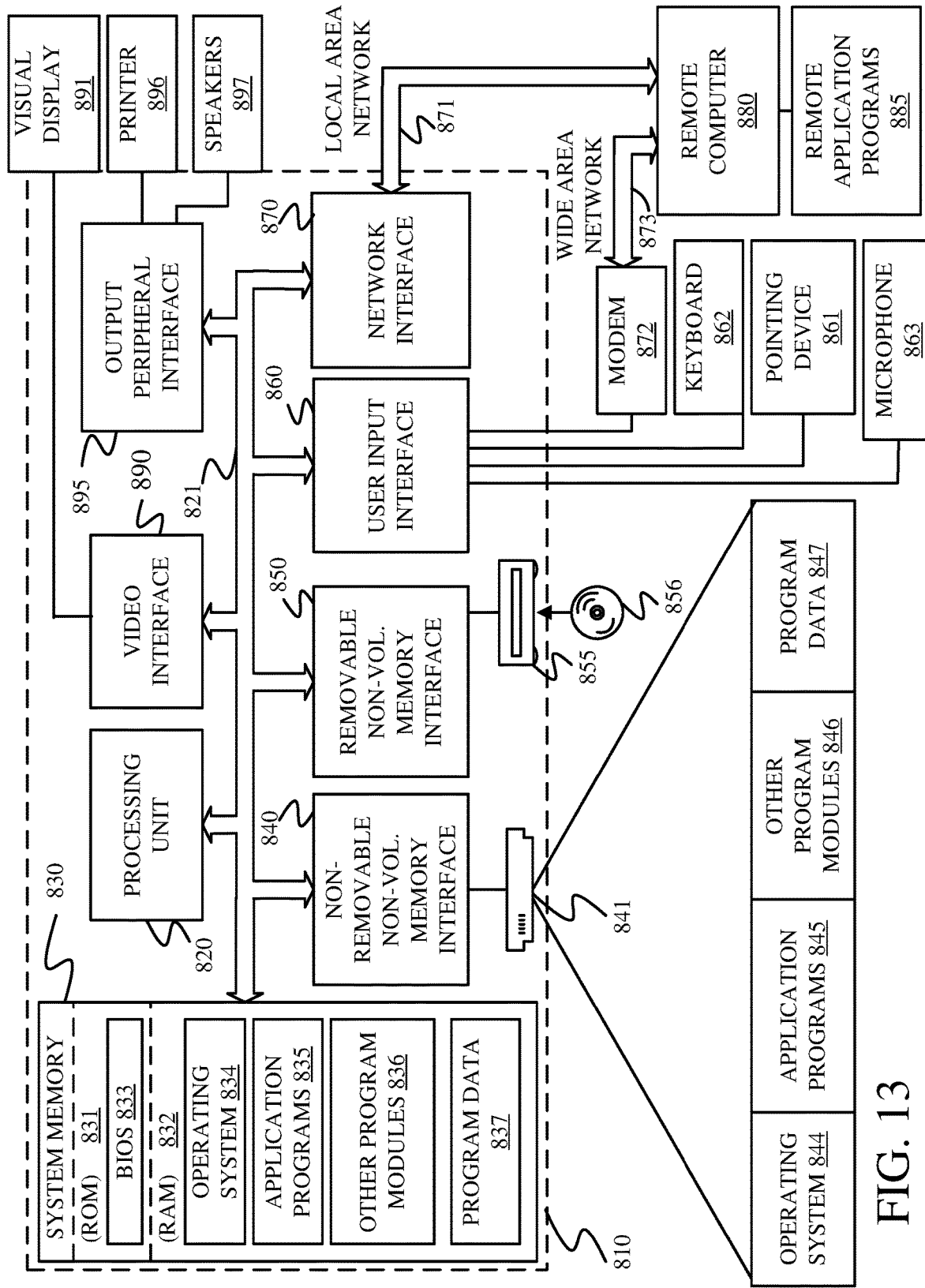
FIG. 13 is a block diagram showing one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous FIGS. can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

a natural language processor (NLP) that receives a textual input, indicative of a given received chat message, and context information, identified based on a previously received chat message that was received previous to the given received chat message, the natural language processor generating an NLP output identifying a concept in the given received chat message based on the textual input and the context information;

an expiration indication generator that generates an expiration indicator corresponding to the identified concept;

context filtering logic that filters the NLP output based on the expiration indicator to obtain a filtered NLP output and provides the filtered NLP output back to the natural language processor, as context information, for a subsequently received chat message that is received subsequent to the given received chat message; and a bot controller that receives the NLP output from the natural language processor and generates a response output based on the NLP output.

Example 2 is the computing system of any or all previous examples wherein the context filtering logic comprises:

an expiration criteria processor configured to identify a relevance of the context information to the subsequently received chat message based on the expiration indicator.

Example 3 is the computing system of any or all previous examples wherein the expiration indication generator is configured to generate a concept-level expiration indicator corresponding to each of a plurality of concepts identified in the given received chat message.

Example 4 is the computing system of any or all previous examples wherein the plurality of concepts, together, comprise overall context information and wherein the expiration indication generator is configured to generate an overall expiration indicator corresponding to the overall context information.

Example 5 is the computing system of any or all previous examples wherein the context filter logic comprises:

a context filtering system that filters the context information based on the relevance to the subsequently received chat message.

Example 6 is the computing system of any or all previous examples wherein the context filter system is configured to filter the context information by deleting identified concepts, from the context information, based on the relevance.

Example 7 is the computing system of any or all previous examples wherein the context filter system is configured to filter the context information by adjusting a weight associated identified concepts, in the context information, based on the relevance.

Example 8 is the computing system of any or all previous examples wherein the expiration indication generator comprises:

a time stamp generator that generates a time stamp indicative of when the concept is identified by the natural language processor.

Example 9 is the computing system of any or all previous examples wherein the expiration indication generator comprises:

a location stamp generator that generates a location stamp indicative of geographic location where the given received chat message was generated.

Example 10 is the computing system of any or all previous examples wherein the expiration indication generator comprises:

a dialog turn counter that generates a turn count stamp indicative of a dialog turn corresponding to the given received chat message.

Example 11 is a computer implemented method, comprising:

receiving, at a natural language processor, a textual input, indicative of a given received chat message, and context information, identified based on a previously received chat message that was received previous to the given received chat message;

generating, with the natural language processor, an NLP output identifying a concept in the given received chat message based on the textual input and the context information;

generating an expiration indicator corresponding to the identified concept;

filtering the NLP output based on the expiration indicator to obtain a filtered NLP output;

providing the filtered NLP output back to the natural language processor, as context information, for a subsequently received chat message that is received subsequent to the given received chat message; and generating, with a bot controller, a response output based on the NLP output.

Example 12 is the computer implemented method of any or all previous examples wherein filtering comprises:

identifying a relevance of the context information to the subsequently received chat message based on the expiration indicator.

Example 13 is the computer implemented method of any or all previous examples wherein generating an expiration indicator comprises:

generating a concept-level expiration indicator corresponding to each of a plurality of concepts identified in the given received chat message.

Example 14 is the computer implemented method of any or all previous examples wherein the plurality of concepts, together, comprise overall context information and wherein generating the expiration indicator comprises:

generating an overall expiration indicator corresponding to the overall context information.

Example 15 is the computer implemented method of any or all previous examples wherein filtering comprises:

filtering the context information based on the relevance to the subsequently received chat message.

Example 16 is the computer implemented method of any or all previous examples wherein filtering comprises:

filtering the context information by deleting identified concepts, from the context information, based on the relevance.

Example 17 is the computer implemented method of any or all previous examples wherein filtering comprises:

filtering the context information by adjusting a weight associated identified concepts, in the context information, based on the relevance.

Example 18 is the computer implemented method of any or all previous examples wherein generating an expiration indicator comprises:

generating a time stamp indicative of when the concept is identified by the natural language processor.

Example 19 is the computer implemented method of any or all previous examples wherein generating an expiration indicator comprises:

generating a location stamp indicative of geographic location where the given received chat message was generated.

Example 20 is a chat bot computing system, comprising:

a natural language processor (NLP) that receives a textual input, indicative of a first chat message, and context information, identified based on a previously received chat message that was received previous to the first chat message, the natural language processor generating an NLP output identifying a concept in the first chat message based on the textual input and the context information;

an expiration indication generator that generates an expiration indicator corresponding to the identified concept;

an expiration criteria processor configured to identify a relevance of the context information to the subsequently received chat message based on the expiration indicator;

context filtering logic that filters the NLP output based on the relevance to obtain a filtered NLP output and provides the filtered NLP output back to the natural language processor, as context information, for a subsequently received chat message that is received subsequent to the first chat message; and a bot controller that receives the NLP output from the natural language processor and generates a response output based on the NLP output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a natural language processor (NLP) that receives a textual input, indicative of a given received chat message, and context information, identified based on a previously received chat message that was received previous to the given received chat message, the natural language processor generating an NLP output identifying a concept in the given received chat message based on the textual input and the context information;
an expiration indication generator that generates an expiration indicator corresponding to the identified concept;
context filtering logic that filters the NLP output based on the expiration indicator to obtain a filtered NLP output and provides the filtered NLP output back to the natural language processor, as context information, for a subsequently received chat message that is received subsequent to the given received chat message; and
a bot controller that receives the NLP output from the natural language processor and generates a response output based on the NLP output.

2. The computing system of claim 1 wherein the context filtering logic comprises:
an expiration criteria processor configured to identify a relevance of the context information to the subsequently received chat message based on the expiration indicator.

3. The computing system of claim 2 wherein the expiration indication generator is configured to generate a concept-level expiration indicator corresponding to each of a plurality of concepts identified in the given received chat message.

4. The computing system of claim 3 wherein the plurality of concepts, together, comprise overall context information and wherein the expiration indication generator is configured to generate an overall expiration indicator corresponding to the overall context information.

5. The computing system of claim 4 wherein the context filter logic comprises:
a context filtering system that filters the context information based on the relevance to the subsequently received chat message.

6. The computing system of claim 5 wherein the context filter system is configured to filter the context information by deleting identified concepts, from the context information, based on the relevance.

7. The computing system of claim 5 wherein the context filter system is configured to filter the context information by adjusting a weight associated identified concepts, in the context information, based on the relevance.

8. The computing system of claim 1 wherein the expiration indication generator comprises:
a time stamp generator that generates a time stamp indicative of when the concept is identified by the natural language processor.

9. The computing system of claim 1 wherein the expiration indication generator comprises:
a location stamp generator that generates a location stamp indicative of geographic location where the given received chat message was generated.

10. The computing system of claim 1 wherein the expiration indication generator comprises:
a dialog turn counter that generates a turn count stamp indicative of a dialog turn corresponding to the given received chat message.

11. A computer implemented method, comprising:
receiving, at a natural language processor, a textual input, indicative of a given received chat message, and context information, identified based on a previously received chat message that was received previous to the given received chat message;
generating, with the natural language processor, an NLP output identifying a concept in the given received chat message based on the textual input and the context information;
generating an expiration indicator corresponding to the identified concept;
filtering the NLP output based on the expiration indicator to obtain a filtered NLP output;
providing the filtered NLP output back to the natural language processor, as context information, for a subsequently received chat message that is received subsequent to the given received chat message; and
generating, with a bot controller, a response output based on the NLP output.

12. The computer implemented method of claim 11 wherein filtering comprises:
identifying a relevance of the context information to the subsequently received chat message based on the expiration indicator.

13. The computer implemented method of claim 12 wherein generating an expiration indicator comprises:
generating a concept-level expiration indicator corresponding to each of a plurality of concepts identified in the given received chat message.

14. The computer implemented method of claim 13 wherein the plurality of concepts, together, comprise overall context information and wherein generating the expiration indicator comprises:

generating an overall expiration indicator corresponding to the overall context information.

15. The computer implemented method of claim 14 wherein filtering comprises:
filtering the context information based on the relevance to the subsequently received chat message.

16. The computer implemented method of claim 15 wherein filtering comprises:
filtering the context information by deleting identified concepts, from the context information, based on the relevance.

17. The computer implemented method of claim 15 wherein filtering comprises:
filtering the context information by adjusting a weight associated identified concepts, in the context information, based on the relevance.

18. The computer implemented method of claim 11 wherein generating an expiration indicator comprises:
generating a time stamp indicative of when the concept is identified by the natural language processor.

19. The computer implemented method of claim 11 wherein generating an expiration indicator comprises:
generating a location stamp indicative of geographic location where the given received chat message was generated.

20. A chat bot computing system, comprising:
at least one processor; and
memory storing instructions executable by the at least oner processor, wherein the instructions, when executed, cause the chat bot computing system to:
receive a textual input, indicative of a first chat message, and context information, identified based on a previously received chat message that was received previous to the first chat message;
generate, by a natural language processor (NLP), an NLP output identifying a concept in the first chat message based on the textual input and the context information;
generate an expiration indicator corresponding to the identified concept;
identify a relevance of the context information to the subsequently received chat message based on the expiration indicator;
filter the NLP output based on the relevance to obtain a filtered NLP output;
provide the filtered NLP output back to the natural language processor, as context information, for a subsequently received chat message that is received subsequent to the first chat message; and
generate a response output based on the NLP output.

* * * * *